United States Patent [19]

Brimm

[11] 4,040,151
[45] Aug. 9, 1977

[54] PARTIAL TURN PANEL FASTENER

[76] Inventor: Collen Kieth Brimm, 2981 Ditch Road, Simi Valley, Calif. 93063

[21] Appl. No.: 659,585

[22] Filed: Feb. 19, 1976

[51] Int. Cl.² ................. A44B 17/00; F16B 19/00
[52] U.S. Cl. ............................. 24/221 K; 85/5 P; 151/69
[58] Field of Search ......... 85/5 P; 24/221 K, 221 A, 24/221 R; 151/69

[56] References Cited

U.S. PATENT DOCUMENTS

| 2,095,271 | 10/1937 | Swanstrom | 24/221 K |
| 2,486,412 | 11/1949 | Huelster | 24/221 K |
| 2,640,245 | 6/1953 | Becker | 24/221 K |
| 2,662,260 | 12/1953 | Marschner | 24/221 A |
| 3,564,563 | 2/1971 | Trotter et al. | 24/221 K |

FOREIGN PATENT DOCUMENTS

| 607,505 | 8/1960 | Italy | 151/69 |
| 304,912 | 4/1955 | Switzerland | 151/69 |
| 822,016 | 10/1959 | United Kingdom | 24/221 K |

Primary Examiner—Ramon S. Britts
Attorney, Agent, or Firm—John E. Wagner

[57] ABSTRACT

Improved partial turn fastener designed to hold a pair of superimposed panels in fixed registration with each other and allowing release of one panel from the other by merely a partial turn of the knob or screw of the fastener. Featured is the arrangement whereby the panels are maintained together by the pressure applied between a threaded screw and a nut without any intervening springs and the fastening force being determined by the strength of the screw and mating nut. A spring assistance is used for release of the fastener from a partial turn of movement. Locking pin means cooperating with the screw and nut prevent unwanted disassembly of the screw from the nut during unlocking operation.

4 Claims, 5 Drawing Figures

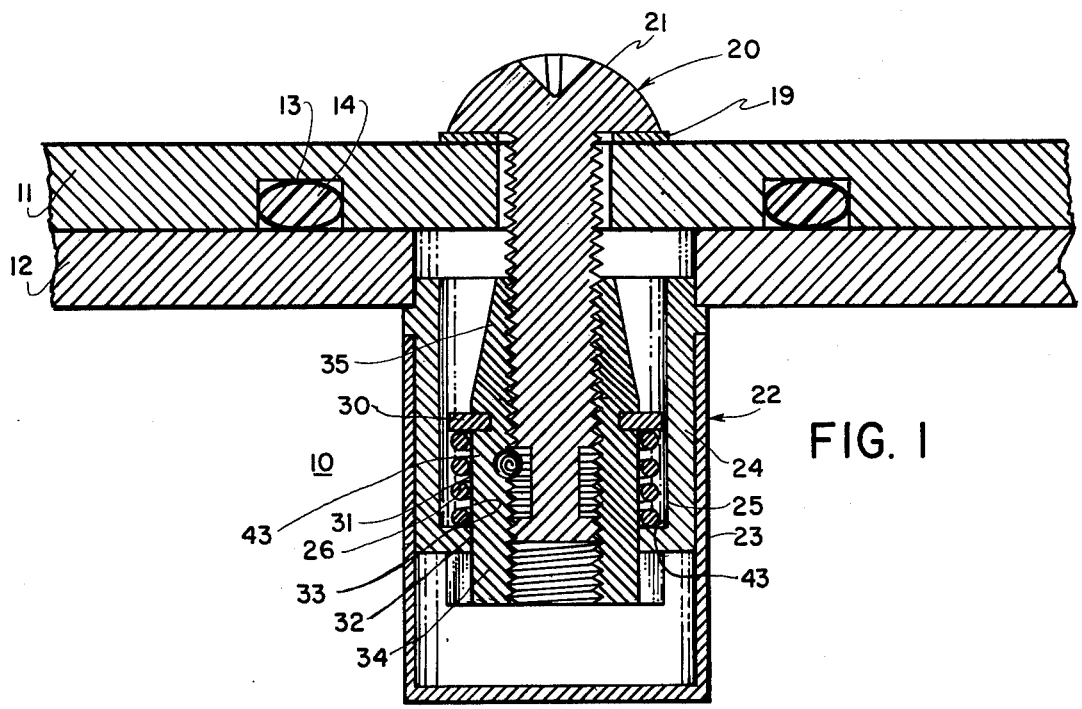
FIG. 1
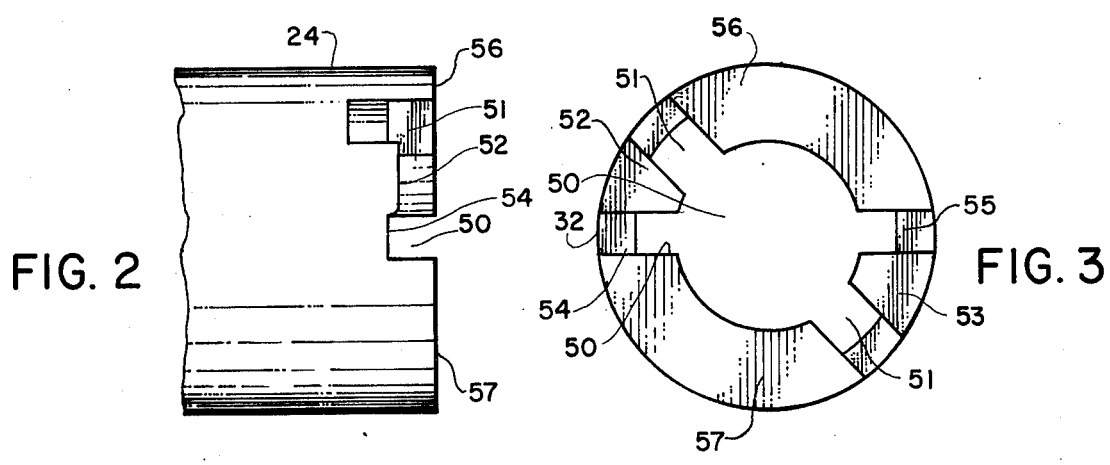
FIG. 2
FIG. 3

PARTIAL TURN PANEL FASTENER

BACKGROUND OF THE INVENTION

The partial turn type fastener is well established in the art as a device for fastening a pair of panels or a panel to a supporting structure together and for its removal by a rapid simple movement, eg. a partial turn on a screw or handle. This type of fastener is found in use in removable panels of aircraft and other vehicles and in electronic equipment housings as well. Often a number of fasteners are used to hold a single panel in place and each is locked or unlocked by the partial turn movement. Usually a partial turn clockwise locks the device and a partial turn counter clockwise unlocks it. Characteristically, these devices have an internal spring which partially ejects the head or locking member when in an unlocked position so that viewing a panel from a reasonable distance, any unlocked fasteners are are easily visible by the protruding head portion.

Most of the partial turn fasteners employ a resilient spring member to apply the locking or fastening force to the panels. As an example, a key like member on the end of a locking stud is inserted through the panels and through a resilient saddle like member. By a partial turn of the locking stud, the key portions engage the resilient saddle and, employing the spring characteristics of the saddle, lock the panels together. Typical of such type of locking device is U.S. Pat. No. 2,640,244, FIGS. 1–4 and U.S. Pat. Nos. 2,839,808 and 2,843,907 to Zahodiakin. These latter two patents and FIGS. 5–12 of the Becker U.S. Pat. No. 2,640,244 also disclose the use of an internal locking nut which cooperates with the stud.

U.S. Pat. No. 2,922,211 to Boyd shows such a locking stud which engages a threaded sleeve.

In each of these representative prior art devices, plus all devices of art with which the applicant is familiar, the fastening device either obtains its fastening strength or force through the resiliency of the spring like member such that with aging, temperature changes, crystallization or other variations, the locking forces vary. As an alternative where a direct screw nut connection is achieved, it is possible to back the screw off without releasing the panels until the screw is totally removed. This defeats the purpose of partial turn release.

BRIEF STATEMENT OF THE INVENTION

Faced with these two deficiencies in the prior art, I have developed an improved partial turn fastener which provides locking of panels together by a partial turn plus tightening to any desire pressure by the design of the threaded member. There are no spring members in the lock affecting locking pressure. Upon release, the arrangement by a partial turn counter clockwise movement, the panels are released or in any event, the fastening member may not be withdrawn from the assembly without first releasing the panels.

Given the above characteristics, the fastening device provides screw-nut tightening capability plus partial turn release insurance. It also achieves the above with a relatively small number of parts making up the assembly.

In an alternate embodiment, any standard screw fastener may be used whereby the use may employ whatever fastener member is desired, and deviations in panel thicknesses which formally required a special fastener are of no concern for the user.

BRIEF DESCRIPTION OF THE DRAWING

The foregoing features of this invention may be more clearly understood by reference to the following detailed description and by reference to the drawings in which:

FIG. 1 is a longitudinal sectional view through a fastener of this invention;

FIG. 2 is a fragmentary side view of the receptical portion of this invention;

FIG. 3 is an end view of the receptical of FIG. 2;

DETAILED DESCRIPTION OF THE INVENTION

Figure 4:
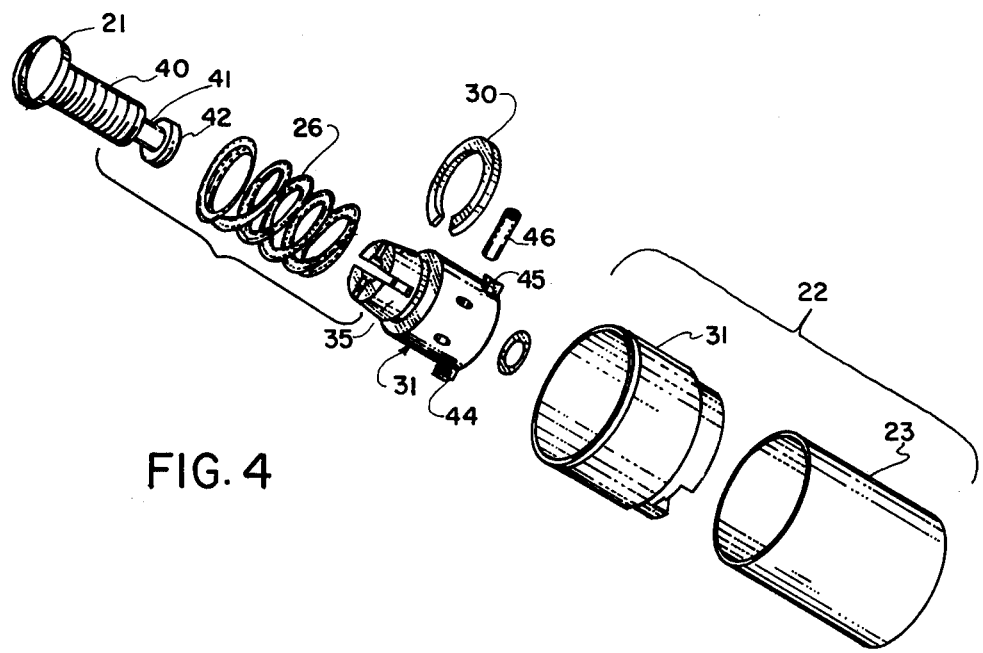
FIG. 4 is an exploded view of the partial turn fastener of this invention.

Now referring to the drawings, particularly FIGS. 1–3, a fastening device in accordance with this invention appears thereon generally designated 10. It is designed to hold a removable panel 11 in fixed position with respect to a sub-panel or frame 12. In this embodiment, the panel 11 includes a circular recess 13 holding an "O" ring 14 in order that the two panels 11 and 12 may be held in sealed relationship although such sealing is optional. The fastening device 10 comprises basically two separable portions, the panel retainer generally designated 20, or alternately a knob (unshown), having in this embodiment an external washer 19 and screw head 21 for hand tightening and removal. The panel retainer 20 is associated with the outer panel 11 and may be removed totally from both panels 11 and 12. Associated with the panel 12 is a fixed assembly generally designated 22 comprising a cover 23 and a receptical 24. Both the cover 23 and the receptical 24 are generally closed end tubular members. The function of the cover 23 of course, is to seal the fastener and protect it from the entrance of any dust or to prevent any interference by the working parts of the fastener with the operating equipment behind the panel 12. The receptical 24 is not strictly closed end in that it includes an internal lip or rim 25 on which the lower or inner most end of a helical ejection spring 26 rests.

The opposite end of spring 26 bears against a retainer ring 30 or alternately an integral shoulder which engages the outer wall of a sleeve member 31 of the panel assembly 20. This sleeve member 31 includes internal threads 32. The upper end 35 of the sleeve 31 is reduced in diameter and includes a pair of diametrical slots best seen in FIG. 4. The internal threads of the sleeve 31 engage mating threads on a screw 40 of the panel retainer 20. This screw 40 includes a reduced throat section 41 in an outer head portion 42. The throat portion 41 is encircled by an annular recess. A locking pin 46 such as a roll pin passes through off center holes in the sleeve 31 limiting outward travel of the screw 40. The receptical retainer may be advanced in and out of the sleeve 31 with a higher than normal degree of friction because the slotted portions of the sleeve are compressed slightly inwardly. The inward protrusion of the threads increases the friction to the point that the receptical assembly including the screw 40 and sleeve 31 normally turn as a single member during the partial turn locking operation. When in a locked or fully unlocked condition, the panel retainer 20 may be partially removed at least from the sleeve by counter clockwise rotation of the screw head 21. An attempt to remove the screw 21 and shank 40, moreover, brings the head portion 42 into engagement with the locking pin 46 preventing the separation of the screw 40 and the sleeve 31.

The sleeve 31 includes a pair of ears 44 and 45 best seen in FIG. 4 which pass through the key opening in the receptical 24. This opening 50 may be seen in FIGS. 2 and 3 having dimensions slightly greater than that of the ears 44 and 45 appearing in FIG. 4.

The end of the receptical 24 as may be seen in FIGS. 2 and 3 includes 3 distinct regions, namely the slot 51, a pair of low regions 52 and 53 adjacent to the slot 51, a pair of detent recesses 54 and 55 and a pair of high regions 56 and 57. These separate regions of the receptical are comparable to the regions present in most partial turn fasteners and therefore reference to the prior art will explain the functions thereof. Briefly, the slot 51 allows the key end of the panel retainer in the form of ears 44 and 45 to be inserted through the receptical 24. By the application of slight axial pressure on the knob or screw head 21, the spring 26 is depressed and the key allowed to be turned over the low region until it strikes the abutment surface adjoining the detent regions 52 and 53 and the adjacent high regions 56 and 57. Relaxation of the spring loaded pressure allows the ears 44 and 45 to rest in the detent portions 54 and 55 in a conventional partial turn locking arrangement.

Thereafter, clockwise rotation of the knob or screw head 21 overcomes the frictional resistance of the sleeve 31 and stud 40 and the fastening device may be tightened to whatever degree of force is desired. The internal locking mechanism will not rotate where the receptical 24 is secured to the inner panel 12 up to the limit of the thread strength or of the shear strength of the ears 44 and 45.

Upon counter clockwise rotation of the knob or screw head 21, the greater frictional engagement between the sleeve 31 and the stud 40 will cause the ears 44 and 45 to slide out of the detent recesses 54 and 55, up over the low portions 52 and 53 and into the slot 51 whereupon the fastener is released and the spring 26 ejects the panel fastener outward until the upper end of sleeve strikes the underside of panel 11.

If the frictional engagement between the ears 44 and 45 and the receptical 24 exceeds that of the engagement between the stud 40 and the sleeve 31, a counter clockwise movement of the knob 21 will tend to remove the stud 40 from the sleeve 31. After a movement of approximately one turn, the second retainer namely pin 46 engages the head portion 42 of the stud 40 with the edge of the recess 33 in the sleeve preventing further withdrawal of the stud 40. Thereupon, there is metal to metal contact between the entire panel retainer assembly 20 and the frictional restraint between the ears 44 and 45 and the receptical 24 will be overcome.

Referring now to FIG. 4 where the panel fastener of FIGS. 1-3 are shown in exploded form, the relative simplicity of the fastener is apparent. The cover, of course, is optional as most fasteners are not totally enclosed. Beyond that, the fastener is made up of three basic parts plus a single retainer ring. Thhis is in contrast with most partial turn fasteners which usually have more than six parts. In this device, both the features of screw tightening for maximum holding strength and withdrawal prevention are provided in contrast with prior art.

In certain cases, these dual features are unnecessary and one other desirable characteristic should be in the partial turn fastener. That is the main exposed operating member, for example, the headed screw is a standard screw machine part and one which the user may select the part as to dimensions, finish, type of head, and in particular, length, as he may require. In each of the prior art partial turn fasteners and the embodiment of FIGS. 1-4, the fastener is designed for a particular range of panel thicknesses and the panel fastener member is designed and produced for that particular thickness and of a particular desired external finish and configuration.

Figure 5:
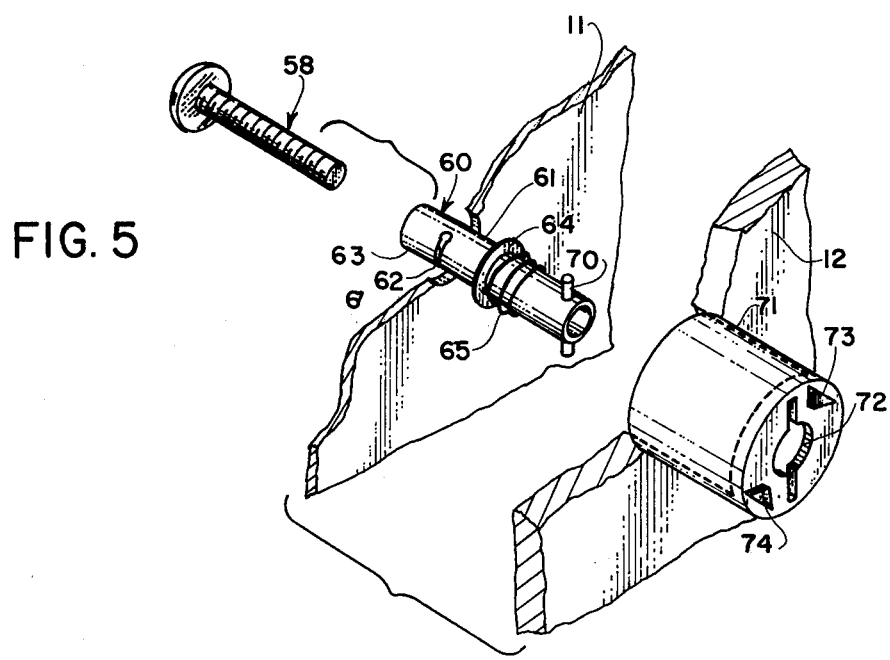
FIG. 5 is an exploded view of an alternate embodiment of this invention.

The embodiment of FIG. 5, by way of contrast, shows a partial turn fastener in accordance with this invention including only four parts and one of the parts is a standard threaded machine screw 58 or any other type of screw fastener which the user may desire. It may be flat head, round head, philips or standard slot machine screw or a screw shank knob. In this case, a sleeve member 60 includes an elongated internally threaded portion 61 having a semi-circular slot 6 therethrough and slightly deformed or bent length 63 to provide the additional friction. The portion 62 terminates in a retaining ring 64 behind which the ejection spring 65 is positioned. An extension 66 of the sleeve 60 includes a transverse locking pin 70 extending through the sleeve 60 and locking pin 70 combination constitutes the equivalent of the sleeve 31 and ears 44 and 45 of the previous embodiment.

In this case, a receptical 71 is shown to be cup shaped with a winged slot 72 therethrough and a pair of stops 73 and 74 adjacent to the slot 72. The fastening device of FIG. 5 operates similarly to that of FIG. 1-4 in that with the screw 58 engaging the sleeve 60 which may be inserted into the receptical 71 with the locking pin 70 extending through the slot 72 against the bias of the ejection spring 65. A partial turn clockwise movement of the screw 58 rotates the sleeve 60 and the locking pin 70 into abutment against the stops 73 and 74. Further clockwise rotation of the screw provides tightening of the screw head 58 and the receptical 71. Typically, a pair of panels 11 and 12 are positioned therebetween.

It is apparent in this embodiment that the two special devices making up this fastener are the sleeve 60 and the receptical 71. The screw 58 is standard. This provides a flexibility described above in the selection of the screw portion of the fastener. You will note that in this embodiment, no detent is shown in the receptical. This ommission is intentional and the locking pin 70 is shown as circular in cross section. This arrangement allows reasonably low frictional engagement between the locking pin 70 and the receptical 71 on rotation. Therefore, counter clockwise rotation of the screw, with the excess friction present between the deformed sleeve 70 and the screw threads insures a backing off of the panel fastener to the 90° release position without disengagement between the screw 58 and the sleeve 60. This embodiment simplification results in reduction in total number of parts and adds the flexibility of selection of the outer screw 58. It does lack the positive protection from unintentional separation of the parts as is prevented in the embodiment of FIGS. 1-4, however, the tradeoffs afforded by this simplified version does provide significant utility to this embodiment.

The above described embodiments of this invention are merely descriptive of its principles and are not to be considered limiting. The scope of this invention instead shall be determined from the scope of the following claims, including their equivalents.

What is claimed is:

1. Partial turn fastening means adapted to hold a first and second apertured members together, comprising;
   - a receptical positioned on one side of said second member over the aperture therein; and
   - a retaining assembly including key portions extending through the aperture in the first member into engagement with the receptical in said second member;
   - said receptical including a slot and a region for holding the key portion of said retaining assembly through said slot upon partial turn of said key portion;
   - said retaining assembly including a screw with its head on the exposed side of said first member and a sleeve having threads mated with said screw, said sleeve including said key portion; and
   - spring means engaging said receptical and said sleeve for partially ejecting said sleeve when said key member is not in an engagement with said receptical; and
   - said screw, sleeve and receptical constituting the fastening pressure applying elements of said fastening means without spring elements therebetween.

2. The combination in accordance with claim 1 wherein said screw includes a portion of reduced diameter than the screw threads and said partial withdrawal limiting means comprises a pin extending transversely into said sleeve and adjacent said reduced diameter portion of said screw to prevent the withdrawal of said screw with said pin in place.

3. The combination in accordance with claim 2 wherein said screw includes a longitudinally extending recess in the periphery thereof in the region thereof within said sleeve;
   - said pin extending at least partially through said sleeve transverse to the longitudinal direction of travel of said screw;
   - and into said longitudinal recess in said screw whereby the extent of entrance of said screw into said receptical and the withdrawal therefore is limited to said pin.

4. Partial turn fastening means adapted to hold a first and second apertured members together, comprising;
   - a receptical positioned on one side of said second member over the aperture therein; and
   - a retaining assembly including key portions extending through the aperture in the first member into engagement with the receptical in said second member;
   - said receptical including a slot and a region for holding the key portion of said retaining assembly through said slot upon partial turn of said key portion;
   - said retaining assembly including a screw with its head on the exposed side of said first member and a sleeve having threads mated with said screw, said sleeve including said key portion;
   - means allowing only a partial withdrawal of said screw from said sleeve; and
   - spring means engaging said receptical and said sleeve for partially ejecting said sleeve when said key member is not in an engagement with said receptical; and
   - said screw, sleeve and receptical constituting the fastening pressure applying elements of said fastening means,
   - wherein said partial separating limiting means comprises a portion of said sleeve having internal threads distorted to increase frictional engagement between the sleeve and said screw.

* * * * *